(12) United States Patent
Take et al.

(10) Patent No.: US 8,420,247 B2
(45) Date of Patent: Apr. 16, 2013

(54) CROSSLINKING POLYMER-SUPPORTED POROUS FILM FOR BATTERY SEPARATOR AND USE THEREOF

(75) Inventors: Hiroyoshi Take, Ibaraki (JP); Shuhei Murata, Ibaraki (JP); Shigeru Fujita, Ibaraki (JP); Yoshihiro Uetani, Ibaraki (JP); Shinji Bessho, Takatsuki (JP); Satoshi Nishikawa, Otsu (JP)

(73) Assignees: Nitto Denko Corporation, Osaka (JP); Sunstar Engineering Inc., Osaka (JP)

( * ) Notice: Subject to any disclaimer, the term of this patent is extended or adjusted under 35 U.S.C. 154(b) by 551 days.

(21) Appl. No.: 12/664,680

(22) PCT Filed: Jun. 6, 2008

(86) PCT No.: PCT/JP2008/060496
§ 371 (c)(1),
(2), (4) Date: Dec. 15, 2009

(87) PCT Pub. No.: WO2008/152991
PCT Pub. Date: Dec. 18, 2008

(65) Prior Publication Data
US 2010/0183908 A1     Jul. 22, 2010

(30) Foreign Application Priority Data

Jun. 15, 2007    (JP) .................................. 2007-158803

(51) Int. Cl.
*H01M 2/14*        (2006.01)
(52) U.S. Cl.
USPC ............ 429/129; 429/188; 429/249; 429/247
(58) Field of Classification Search .................. 429/188, 429/129, 247, 249
See application file for complete search history.

(56) References Cited

U.S. PATENT DOCUMENTS

2004/0157118 A1 *    8/2004    Uetani et al. .................. 429/144

FOREIGN PATENT DOCUMENTS

| EP | 1657766 A1 | 5/2006 |
|----|------------|--------|
| JP | 10-172606 A | 6/1998 |
| JP | 10-177865 A | 6/1998 |
| JP | 10-189054 A | 7/1998 |
| JP | 2004-335210 A | 11/2004 |
| JP | 2005-100951 A | 4/2005 |
| JP | 2006-131808 A | 5/2006 |
| JP | 2006-196199 A | 7/2006 |
| JP | 2007-123254 A | 5/2007 |
| JP | 2007-157570 A | 6/2007 |
| JP | 2007-280947 A | 10/2007 |
| WO | WO 2006075728 A1 | 7/2006 |
| WO | 2006/112206 A1 | 10/2006 |

OTHER PUBLICATIONS

Communication dated Dec. 6, 2011 from the European Patent Office in counterpart European application No. 08777116.8.
Communication, dated Jan. 10, 2012, issued by the State Intellectual Property Office of P.R. China in corresponding Chinese Application No. 200880020382.7.
International Search Report for PCT/JP2008/060496 dated Sep. 16, 2008 [PCT/ISA/210].
Written Opinion for PCT/JP2008/060496 [PCT/ISA/237].
Notification of Reasons for Refusal, mailed Jul. 10, 2012, issued in Chinese Patent Application No. 2007-158803.

\* cited by examiner

*Primary Examiner* — Jane Rhee
(74) *Attorney, Agent, or Firm* — Sughrue Mion, PLLC

(57) ABSTRACT

The present invention relates to a crosslinking polymer-supported porous film for battery separator, including: a porous film; and a crosslinking polymer supported on the porous film, the crosslinking polymer having a plurality of cation-polymerizable functional groups in the molecule thereof and having oxyalkylene groups represented by general formula (I):

[Chem. 1]

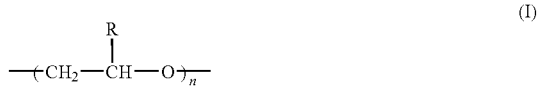

in which the Rs may be the same or different and each independently represent a hydrogen atom or a methyl group, and n represents an integer of 4 to 9, in a side chain thereof.

13 Claims, No Drawings

CROSSLINKING POLYMER-SUPPORTED POROUS FILM FOR BATTERY SEPARATOR AND USE THEREOF

TECHNICAL FIELD

The present invention relates to a crosslinking polymer-supported porous film for battery separator which includes a porous film substrate and, supported thereon, a crosslinking polymer having a plurality of cation-polymerizable functional groups in the molecule thereof and having oxyalkylene groups in a side chain thereof, and the use thereof, in particular, a process for producing a battery including a separator and electrodes adhered to the separator using the crosslinking polymer-supported porous film.

BACKGROUND ART

Lithium ion secondary batteries having a high energy density are extensively used in recent years as power sources for small portable electronic appliances such as cell phones and notebook type personal computers. Such a lithium ion secondary battery is produced through the steps of stacking or winding sheet-form positive and negative electrodes together with, for example, a porous polyolefin resin film, introducing the resultant stack into a battery container constituted of, for example, a metallic can, subsequently pouring an electrolyte solution into the battery container, and tightly sealing the opening of the battery container.

Recently, however, such small portable electronic appliances are exceedingly strongly desired to be further reduced in size and weight. Under these circumstances, lithium ion secondary batteries also are desired to be further reduced in thickness and weight. Battery containers of the laminated-film type have also come to be used in place of conventional metallic can cases.

Compared with the conventional metallic can cases, battery containers of the laminated-film type have a drawback that an areal pressure for keeping the distance between the positive and negative electrodes constant cannot be sufficiently applied to electrode surfaces. Because of this, these battery containers has a problem that the distance between the electrodes partly increases with the lapse of time due to the expansion/contraction of the electrode active materials during battery charge/discharge, resulting in an increase in the internal resistance of the battery and hence in a decrease in battery characteristics. In addition, there is a problem that unevenness of resistance occurs in the battery and this also reduces battery characteristics. In the case of producing a sheet-form battery having a large area, there has been a problem that the distance between the electrodes cannot be kept constant and the internal resistance of the battery becomes uneven, making it impossible to obtain sufficient battery characteristics.

In order to overcome such problems, it has been proposed to adhere electrodes to a separator with an adhesive resin layer including an electrolyte-solution phase, a polymer gel layer containing the electrolyte solution, and a solid polymer phase (see, for example, patent document 1).

Furthermore, a method has been proposed which includes coating a separator with a binder resin solution containing a poly(vinylidene fluoride) resin as a main component, stacking electrodes on the coated separator, drying the binder resin solution to form an electrode stack, introducing the electrode stack into a battery container, and then pouring an electrolyte solution into the battery container to obtain a battery in which the separator has been adhered to the electrodes (see, for example, patent document 2).

It has also been proposed to obtain a battery containing electrodes adhered to a separator, by adhering a separator impregnated with an electrolyte solution to positive and negative electrodes with a porous adhesive resin layer to bring the separator into contact with the electrodes and cause the adhesive resin layer to hold the electrolyte solution in the through-holes thereof (see, for example, patent document 3).

However, those processes have had the following problem. The thickness of the adhesive resin layer must be increased in order to obtain sufficient adhesive force between the separator and each electrode. Because of this and because the amount of the electrolyte solution relative to that of the adhesive resin cannot be increased, the obtained battery has increased internal resistance. Consequently, sufficient cycle characteristics and sufficient high-rate discharge characteristics cannot be obtained.

Patent Document 1: JP-A-10-177865
Patent Document 2: JP-A-10-189054
Patent Document 3: JP-A-10-172606

DISCLOSURE OF THE INVENTION

The invention has been achieved in order to overcome the problem described above which is encountered in the production of a battery containing electrodes adhered to a separator. An object of the invention is to provide a porous film having a crosslinking polymer supported thereon, the porous film being for use as a separator which attains sufficient adhesion between the electrode and the separator and is excellent in the property of swelling in an electrolyte solution and which is suitable for use in producing a battery having low internal resistance and excellent high-rate characteristics. Another object is to provide a process for producing a battery using the crosslinking polymer-supported porous film.

Namely, according to the invention, there is provided a crosslinking polymer-supported porous film for battery separator, including:
a porous film; and
a crosslinking polymer supported on the porous film, the crosslinking polymer having a plurality of cation-polymerizable functional groups in the molecule thereof and having oxyalkylene groups represented by general formula (I):

[Chem. 1]

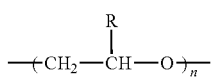

(I)

in which the Rs may be the same or different and each independently represent a hydrogen atom or a methyl group, and n represents an integer of 4 to 9,
in a side chain thereof.

The cation-polymerizable functional groups are preferably at least one selected from a 3-oxetanyl group and an epoxy group.

The crosslinking polymer is preferably a radical copolymer of: at least one radical-polymerizable monomer which has the cation-polymerizable functional group and is selected from a radical polymerizable monomer having a 3-oxetanyl group and a radical polymerizable monomer having an epoxy group; a radical-polymerizable monomer having oxyalkylene groups; and other radical-polymerizable monomer.

The crosslinking polymer is preferably a radical copolymer of: 5 to 50% by weight of at least one radical-polymerizable monomer selected from the radical-polymerizable monomer having the 3-oxetanyl group and the radical-polymerizable monomer having the epoxy group; 1 to 95% by weight of the radical-polymerizable monomer having the oxyalkylene groups; and the other radical-polymerizable monomer, based on the total monomer amount.

The radical-polymerizable monomer having the oxyalkylene groups is preferably a (meth)acrylate which has oxyalkylenes group and is represented by general formula (II):

[Chem. 2]

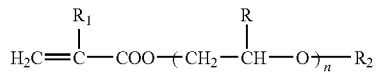

(II)

in which the Rs may be the same or different and each independently represent a hydrogen atom or a methyl group; $R_1$ represents a hydrogen atom or a methyl group; $R_2$ represents an alkyl group having 1 to 6 carbon atoms; and n represents an integer of 4 to 9.

The radical-polymerizable monomer having the 3-oxetanyl group is preferably a (meth)acrylate which has a 3-oxetanyl group and is represented by general formula (III):

[Chem. 3]

(III)

in which $R_1$ represents a hydrogen atom or a methyl group, and $R_2$ represents a hydrogen atom or an alkyl group having 1 to 6 carbon atoms.

The radical-polymerizable monomer having the epoxy group is preferably a (meth)acrylate which has an epoxy group and is represented by general formula (IV):

[Chem. 4]

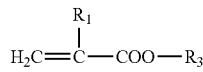

(IV)

in which $R_1$ represents a hydrogen atom or a methyl group, and $R_3$ represents an epoxy-containing group represented by formula (1):

[Chem. 5]

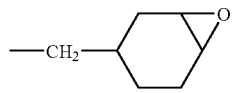

(1)

or formula (2).

[Chem. 6]

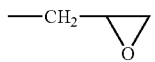

(2)

The other radical-polymerizable monomer is preferably at least one monomer selected from a (meth)acrylate represented by general formula (V):

[Chem. 7]

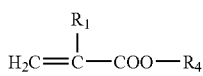

(V)

in which $R_1$ represents a hydrogen atom or a methyl group, and $R_4$ represents an alkyl group having 1 to 6 carbon atoms or a fluoroalkyl group having 1 to 6 carbon atoms and a vinyl ester represented by general formula (VI):

[Chem. 8]

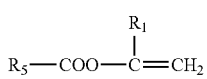

(VI)

in which $R_1$ represents a hydrogen atom or a methyl group, and $R_5$ represents a methyl group or an ethyl group.

The porous film as a substrate preferably has a thickness in the range of 3 to 50 μm and a porosity in the range of 20 to 95%.

The crosslinking polymer preferably has a weight average molecular weight of 10,000 or higher.

Additionally, according to the invention, there is provided a process for producing a battery, the process including:

stacking electrodes on the crosslinking polymer-supported porous film to obtain an electrodes/crosslinking polymer-supported porous film stack;

introducing the electrodes/crosslinking polymer-supported porous film stack into a battery container; and pouring an electrolyte solution containing a cation-polymerization catalyst into the battery container, whereby at least a part of the crosslinking polymer is swelled in the electrolyte solution or dissolved in the electrolyte solution at least around the interface between the porous film and the electrodes to undergo cation polymerization, thereby at least partially gelling the electrolyte solution to adhere the porous film and the electrodes.

The cation-polymerization catalyst is preferably an onium salt.

The electrolyte solution preferably contains at least one selected from lithium hexafluorophosphate and lithium tetrafluoroborate, as an electrolyte salt serving also as a cation-polymerization catalyst.

The crosslinking polymer-supported porous film for battery separator of the invention includes a porous film and, supported thereon, a crosslinking polymer having a plurality of cation-polymerizable functional groups in the molecule thereof and having oxyalkylene groups in a side chain thereof.

Consequently, electrodes are stacked on such a crosslinking polymer-supported porous film, namely a separator, to obtain an electrode/separator stack, and this laminate is introduced into a battery container. Thereafter, an electrolyte solution containing a cation-polymerization catalyst is poured into the battery container, and at least a part of the crosslinking polymer is swelled in the electrolyte solution or dissolved in the electrolyte solution at least around the interface between the separator and the electrodes and to undergo cation polymerization. The crosslinking polymer is thus crosslinked to at least partially gelling the electrolyte solution, whereby the separator is tenaciously adhered to the electrodes and an electrode/separator laminate can be obtained. The "at least partially gelling the electrolyte solution" is not particularly limited so long as the gelation is sufficient to produce the effect of the invention. The electrolyte solution may be caused to gel partly or entirety.

In the crosslinking polymer-supported porous film of the invention, the crosslinking polymer has, in a side chain thereof, oxyalkylene groups which have polarity. Because of this, when the electrode/separator stack is immersed in an electrolyte solution which also has polarity, the crosslinking polymer has an affinity for the electrolyte solution. The crosslinking polymer hence swells moderately and comes to have improved ionic conductivity. As a result, a battery having low internal resistance and excellent high-rate characteristics can be obtained.

In addition, according to the crosslinking polymer-supported porous film of the invention, since the crosslinking polymer has the oxyalkylene groups having polarity in a side chain thereof, the molecular movement of the oxyalkylene groups is not inhibited. Hence, the crosslinking polymer has improved ionic conductivity. Consequently, by using this crosslinking polymer-supported porous film as a separator, a battery having low internal resistance and excellent high-rate characteristics can be obtained.

BEST MODE FOR CARRYING OUT THE INVENTION

The porous film to be used in the invention preferably is one having a thickness in the range of 3 to 50 μm. In case where the porous film has a thickness smaller than 3 μm, the porous film has insufficient strength and there is a possibility that use of the porous film as a separator in a battery might result in internal short-circuiting between the electrodes. On the other hand, in case where the porous film has a thickness exceeding 50 μm, the battery employing such a porous film as the separator has too large a distance between the electrodes, resulting in excessively high internal resistance of the battery.

The porous film to be used may be one which has pores having an average pore diameter of 0.01 to 5 μm and has a porosity in the range of 20 to 95%. The porosity thereof is preferably in the range of 30 to 90%, most preferably in the range of 35 to 85%. In case where the porous film has too low a porosity, use of the porous film as a battery separator results in a decrease in the amount of ion conduction paths, making it impossible to obtain sufficient battery characteristics. On the other hand, in case where the porous film has too high a porosity, since the porous film has insufficient strength when used as a battery separator, for obtaining required strength, it is necessary to use such porous film having a larger thickness. This is undesirable because the internal resistance of the battery increases.

Furthermore, the porous film to be use may be one which has an air permeability of 1,500 sec/100 cc or lower, preferably 1,000 sec/100 cc or lower. In case where the air permeability thereof is too high, the porous film has low ionic conductivity when used as a battery separator, making it impossible to obtain sufficient battery characteristics. With respect to strength, it is preferred that the porous film has a puncture strength of 1 N or higher. This is because in case where the puncture strength thereof is lower than 1 N, there is a possibility that this substrate might break when an areal pressure is applied to between the electrodes, resulting in internal short-circuiting.

According to the invention, the porous film is not particularly limited so long as it has the properties described above. However, when solvent resistance and unsusceptibility to oxidation and reduction are taken into account, porous films made of polyolefin resins such as polyethylene and polypropylene are suitable. Of these, a polyethylene resin film is especially suitable for use as the porous film because this resin has the property of melting upon heating to fill the pores and the so-called shutdown function can be imparted to the battery based on that property. The term polyethylene resin herein means not only homopolymers of ethylene but also copolymers of ethylene and an α-olefin such as propylene, butene, or hexene.

Furthermore, according to the invention, a laminated film composed of a porous film of polytetrafluoroethylene, a polyimide, or the like and the porous polyolefin resin film is also suitable as the porous film because this laminated film has excellent heat resistance.

The crosslinking polymer-supported porous film for separator of the invention includes the porous film described above and, supported on the porous film, a crosslinking polymer having a plurality of cation-polymerizable functional groups in the molecule thereof and having oxyalkylene groups represented by general formula (I):

[Chem. 9]

(I)

in which the Rs may be the same or different and each independently represent a hydrogen atom or a methyl group, and n represents an integer of 4 to 9, in a side chain thereof.

In the invention, the above-mentioned cation-polymerizable functional groups are preferably at least one kind selected from a 3-oxetanyl group and an epoxy group (2-oxiranyl group). Consequently, according to the invention, the crosslinking polymer is preferably a radical copolymer of: a radical-polymerizable monomer having oxyalkylene groups (hereinafter referred to as oxyalkylene-containing radical-polymerizable monomer); at least one radical polymerizable monomer selected from a radical-polymerizable monomer having a 3-oxetanyl group (hereinafter referred to as 3-oxetanyl-containing radical-polymerizable monomer) and a radical-polymerizable monomer having an epoxy group (hereinafter referred to as epoxy-containing radical-polymerizable monomer); and optionally other radical-polymerizable monomer(s).

When obtaining the crosslinking polymer having a plurality of cation-polymerizable functional groups in the molecule thereof and having the oxyalkylene groups according to the invention, the oxyalkylene-containing radical-polymerizable monomer may be used in an amount in the range of 1 to 95% by weight, preferably 15 to 70% by weight, based on the total monomer amount, and the at least one radical polymerizable monomer selected from 3-oxetanyl-containing radical-polymerizable monomers and epoxy-containing radical-polymerizable monomers may be used in an amount in the range of 5 to 50% by weight, preferably 10 to 40% by weight, based on the total monomer amount. The other radical-polymerizable monomers may be optionally used in an amount in the range of 0 to 94% by weight, preferably 0 to 49% by weight, more preferably 20 to 45% by weight, based on the total monomer amount.

According to the invention, when the amount of the oxyalkylene-containing radical-polymerizable monomer is in the range of 1 to 95% by weight based on the total monomer amount, the following advantage is brought about. When an electrode/crosslinking polymer-supported porous film stack is immersed in an electrolyte solution in battery production, the crosslinking polymer swells because it has an affinity for the electrolyte solution. The crosslinking polymer hence comes to have improved ionic conductivity. As a result, a battery having low internal resistance and excellent high-rate characteristics can be obtained.

In case where the amount of the oxyalkylene-containing radical-polymerizable monomer is smaller than 1% by weight of the amount of all monomers, this monomer is almost ineffective in enhancing the affinity of the crosslinking polymer for the electrolyte solution. On the other hand, in case where the amount of the oxyalkylene-containing radical-polymerizable monomer is larger than 95% by weight of the amount of all monomers, the resultant crosslinking polymer contains an extremely small amount of cation-polymerizable functional groups. Because of this, when an electrode/crosslinking polymer-supported porous film stack is immersed in an electrolyte solution, this crosslinking polymer is not crosslinked to a degree sufficient to enable the crosslinking polymer to adhere the porous film to the electrodes.

According to the invention, the radical-polymerizable monomer having oxyalkylene groups to be used is preferably an oxyalkylene-containing (meth)acrylate represented by general formula (II):

[Chem. 10]

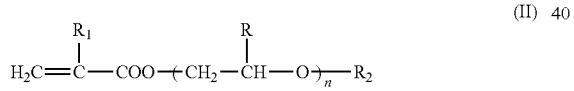

(II)

in which the Rs may be the same or different and each independently represent a hydrogen atom or a methyl group; $R_1$ represents a hydrogen atom or a methyl group; $R_2$ represents an alkyl group having 1 to 6 carbon atoms; and n represents an integer of 4 to 9.

According to the invention, the crosslinking polymer has oxyalkylene groups in a side chain thereof and, hence, has an affinity for electrolyte solution. Because of this, when the crosslinking polymer-supported porous film comes into contact with an electrolyte solution in producing a battery using the crosslinking polymer-supported porous film as a separator, then the crosslinking polymer readily swells and comes to have improved ionic conductivity. As a result, a battery having low internal resistance and excellent high-rate characteristics can be obtained. In addition, according to the invention, the oxyalkylene groups possessed by the crosslinking polymer in a side chain thereof shows high molecular movability especially when the number of repetitions (n) for the oxyalkylene groups is in the range of 4 to 9. As a result, a battery having lower internal resistance and better high-rate characteristics can be obtained.

In case where the number of repetitions (n) for the oxyalkylene groups possessed by the crosslinking polymer in a side chain thereof is 3 or smaller, the oxyalkylene groups have low molecular movability. On the other hand, in case where the number of repetitions (n) for the oxyalkylene groups is 10 or larger, the molecular movability of the oxyalkylene groups is reduced by the polymer main chain. As a result, the oxyalkylene groups in this case have low molecular movability.

According to the invention, the 3-oxetanyl-containing radical-polymerizable monomer to be used preferably are 3-oxetanyl-containing (meth)acrylate represented by general formula (III):

[Chem. 11]

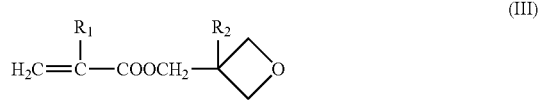

(III)

in which $R_1$ represents a hydrogen atom or a methyl group, and $R_2$ represents a hydrogen atom or an alkyl group having 1 to 6 carbon atoms. In the invention, "(meth)acrylate" means acrylate or methacrylate.

Examples of such 3-oxetanyl-containing (meth)acrylates include 3-oxetanylmethyl (meth)acrylate, 3-methyl-3-oxetanylmethyl (meth)acrylate, 3-ethyl-3-oxetanylmethyl (meth)acrylate, 3-butyl-3-oxetanylmethyl (meth)acrylate, and 3-hexyl-3-oxetanylmethyl (meth)acrylate. These (meth)acrylates may be used alone or in combination of two or more thereof.

According to the invention, the epoxy-containing (meth)acrylate represented by general formula (IV):

[Chem. 12]

(IV)

in which $R_1$ represents a hydrogen atom or a methyl group, and $R_3$ represents an epoxy-containing group represented by formula (1):

[Chem. 13]

(1)

or formula (2):

[Chem. 14]

(2)

is preferably used as the epoxy-containing radical-polymerizable monomer.

Examples of such epoxy-containing (meth)acrylates include 3,4-epoxycyclohexylmethyl (meth)acrylate and glycidyl (meth)acrylate. These (meth)acrylates may be used alone or in combination of two or more thereof.

The other radical-polymerizable monomers to be optionally copolymerized, according to the invention, with the oxyalkylene-containing radical-polymerizable monomer and at least one radical-polymerizable monomer selected from 3-oxetayl-containing radical-polymerizable monomers and epoxy-containing radical-polymerizable monomers, preferably are at least one kind selected from (meth)acrylates represented by general formula (V):

[Chem. 15]

(V)

in which $R_1$ represents a hydrogen atom or a methyl group, and $R_4$ represents an alkyl group having 1 to 6 carbon atoms or a fluoroalkyl group having 1 to 6 carbon atoms and vinyl esters represented by general formula (VI):

[Chem. 16]

(VI)

in which $R_1$ represents a hydrogen atom or a methyl group, and $R_5$ represents a methyl group or an ethyl group.

Examples of the (meth)acrylates represented by general formula (V) include methyl (meth)acrylate, ethyl (meth)acrylate, propyl (meth)acrylate, butyl (meth)acrylate, 2,2,2-trifluoroethyl (meth)acrylate, and 2,2,3,3-tetrafluoropropyl (meth)acrylate.

Examples of the vinyl esters represented by general formula (VI) include vinyl acetate and vinyl propionate.

The crosslinking polymer having oxyalkylene groups and groups of at least one kind selected from a 3-oxetanyl group and an epoxy group can be obtained preferably as a radical copolymer produced through radical copolymerization by subjecting an oxyalkylene-containing monomer and at least one selected from 3-oxetanyl-containing radical-polymerizable monomers and epoxy-containing radical-polymerizable monomers, optionally together with other radical-polymerizable monomer(s), to radical copolymerization using a radical polymerization initiator.

This radical copolymerization may be conducted using any polymerization technique selected from solution polymerization, bulk polymerization, suspension polymerization, emulsion polymerization, and the like. However, it is preferred to employ solution polymerization or suspension polymerization from the standpoints of ease of polymerization, molecular-weight regulation, post-treatment, etc.

The radical polymerization initiator is not particularly limited. For example, use may be made of N,N'-azobisisobutyronitrile, dimethyl N,N'-azobis(2-methylpropionate), benzoyl peroxide, lauroyl peroxide, or the like. In this radical copolymerization, a molecular weight regulator such as, e.g., a mercaptan can be used according to need.

In the invention, it is preferred that the crosslinking polymer having cation-polymerizable functional groups in the molecule thereof and having oxyalkylene groups in a side chain thereof has a weight average molecular weight of 10,000 or higher. In case where the weight average molecular weight of the crosslinking polymer is lower than 10,000, it is necessary to use the crosslinking polymer in a large amount for gelling the electrolyte solution, and the resultant battery hence has reduced battery characteristics. On the other hand, there is no particular upper limit on the weight average molecular weight of the crosslinking polymer. However, the upper limit thereof may be about 3,000,000, preferably about 2,500,000, from the standpoint of enabling the electrolyte solution to be maintained as a gel. It is especially preferred, according to the invention, that the crosslinking polymer has a weight average molecular weight in the range of 100,000 to 2,000,000.

The crosslinking polymer-supported porous film of the invention is one obtained by supporting the crosslinking polymer described above to the porous film described above. Techniques for supporting the crosslinking polymer to the porous film are not particularly limited. For example, use may be made of a method which includes dissolving the crosslinking polymer in a suitable organic solvent such as, e.g., acetone, ethyl acetate, or butyl acetate to prepare a crosslinking polymer solution, applying the crosslinking polymer solution to the surfaces of the porous film by, e.g., casting or spray coating or immersing the porous film in the polymer solution, and then drying the porous film to remove the organic solvent. Also usable is a method in which the crosslinking polymer is formed into a film by melt extrusion and this film is laminated to the porous film by thermal laminating or the like.

The porous film of the invention to which the crosslinking polymer has been supported is a stable film in which the crosslinking polymer does not react in the absence of a cation-polymerization catalyst. The crosslinking polymer-supported porous film hence does not alter even when stored over long.

The process for battery production of the invention, in which the crosslinking polymer-supported porous film obtained by such a method, is explained below.

First, electrodes are stacked or wound together with the crosslinking polymer-supported porous film to obtain an electrode/crosslinking polymer-supported porous film stack. Subsequently, the stack is introduced into a battery container constituted of a metallic can, laminated film, or the like, and terminal welding or the like is conducted if necessary. Thereafter, a predetermined amount of an electrolyte solution containing a cation-polymerization catalyst dissolved therein is poured into the battery container, and the opening of this battery container is tightly sealed. At least a part of the crosslinking polymer supported on the crosslinking polymer-supported porous film is swelled in the electrolyte solution at least around the interface between the porous film and the electrode or dissolved and diffused into the electrolyte solution around the interface between the porous film and the electrode, and is crosslinked through cation polymerization, whereby at least a part of the electrolyte solution is gelled to adhere the electrodes to the porous film. As a result, a battery including the porous film as a separation can be obtained in which the electrodes have been tenaciously bonded to the separator.

In the invention, the crosslinking polymer in the invention functions so as to gelling the electrolyte solution at least around the interface between the porous film and the electrodes to adhere the electrodes to the porous film, based on the crosslinking by cation polymerization, In the invention, the crosslinking polymer can be cationically polymerized and crosslinked even at ordinary temperature although this depends on the structure of the polymer, amount of the polymer supported on the porous film, and kind and amount of the cation-polymerization catalyst. However, the cation polymerization can be accelerated by heating. In this case, heating at a temperature of about 40 to 100° C. for a period of about 0.5 to 24 hours generally suffices, although the heat resistance of the materials constituting the battery and productivity should also be taken into account. In order to swell or to dissolve and diffuse the polymer in an amount sufficient to adhere the electrodes to the porous film, the battery container in which the electrolyte solution has been poured may be allowed to stand at ordinary temperature for about several hours.

In the invention, the electrode/crosslinking polymer-supported porous film laminate is not limited so long as the electrodes have been laminated on the crosslinking polymer-supported porous film. Consequently, the electrode/crosslinking polymer-supported porous film laminate to be used is, for example, a negative electrode/porous film/positive electrode laminate, a negative electrode/porous film/positive electrode/porous film laminate, or the like according to the structure and shape of the battery.

The electrolyte solution is a solution prepared by dissolving an electrolyte salt in a suitable solvent. As the electrolyte salt, use can be made of salts composed of a cation component which is hydrogen, an alkali metal such as lithium, sodium, or potassium, an alkaline earth metal such as calcium or strontium, a tertiary or quaternary ammonium salt, or the like; and an anion component which is an inorganic acid such as hydrochloric acid, nitric acid, phosphoric acid, sulfuric acid, borofluoric acid, hydrofluoric acid, hexafluorophosphoric acid, or perchloric acid or an organic acid such as a carboxylic acid, organic sulfonic acid, or fluorine-substituted organic sulfonic acid. Especially preferred of these are electrolyte salts in which the cation component is an alkali metal ion.

Examples of such electrolyte salts in which the cation component is an alkali metal ion include alkali metal perchlorates such as lithium perchlorate, sodium perchlorate, and potassium perchlorate, alkali metal tetrafluoroborates such as lithium tetrafluoroborate, sodium tetrafluoroborate, and potassium tetrafluoroborate, alkali metal hexafluorophosphates such as lithium hexafluorophosphate and potassium hexafluorophosphate, alkali metal trifluoroacetates such as lithium trifluoroacetate, and alkali metal trifluoromethanesulfonates such as lithium trifluoromethanesulfonate.

Especially in the case of obtaining a lithium ion secondary battery according to the invention, suitable examples of the electrolyte salt to be used are lithium hexafluorophosphate, lithium tetrafluoroborate, lithium perchlorate, and the like.

The solvent to be used for the electrolyte salt in the invention can be any solvent in which the electrolyte salt dissolves. Usable nonaqueous solvents include cyclic esters such as ethylene carbonate, propylene carbonate, butylene carbonate, and γ-butyrolactone, ethers such as tetrahydrofuran and dimethoxyethane, and chain esters such as dimethyl carbonate, diethyl carbonate, and ethyl methyl carbonate. These solvents may be used alone or as a mixture of two or more thereof. The electrolyte salt is suitably determined according to the kind and amount of the solvent to be used.

In the invention, it is preferred to use an onium salt as the cation-polymerization catalyst. Examples of the onium salt include onium salts composed of a cation component such as an ammonium salt, phosphonium salt, arsonium salt, stibonium salt, or iodonium salt and an anion component such as a tetrafluoroborate, hexafluorophosphate, trifluoromethanesulfonate, or perchlorate.

However, according to the invention, of the electrolyte salts shown above, lithium tetrafluoroborate and lithium hexafluorophosphate per se function also as a cation-polymerization catalyst. It is therefore especially preferred according to the invention to use these lithium salts as a cation-polymerization catalyst functioning also as an electrolyte salt. In this case, either lithium tetrafluoroborate or lithium hexafluorophosphate may be used alone, or these two may be used in combination.

EXAMPLES

The invention will be explained below by reference to Examples. However, the invention should not be construed as being limited by the following Examples in any way. In the following, properties of porous films were evaluated in the manners shown below. The molecular weights of crosslinking polymers were determined in the following manner.

Thickness of Porous Film

The thickness of a porous film was determined through a measurement with a 1/10,000 mm thickness gauge and based on a photograph of a section of the porous film taken with a scanning electron microscope at a magnification of 10,000.

Porosity of Porous Film

The porosity of a porous film was calculated using the following equation from the weight W (g) per unit area S ($cm^2$) of the porous film, the average thickness t (cm) thereof, and the density d ($g/cm^3$) of the resin constituting the porous film.

$$\text{Porosity (\%)} = (1-(W/S/t/d)) \times 100$$

Air Permeability of Porous Film

The air permeability of a porous film was determined according to JIS P 8117.

Puncture Strength

A puncture test was conducted using compression tester KES-G5, manufactured by Kato Tech K.K. The maximum load was read from a load-deformation curve obtained in the measurement and was taken as the puncture strength. A needle having a diameter of 1.0 mm and a radius of curvature of the tip of 0.5 mm was used to conduct the test at a rate of 2 cm/sec.

Molecular Weight of Crosslinking Polymer

A crosslinking polymer solution obtained was added to a large amount of methanol with stirring with a high-speed mixer to precipitate the crosslinking polymer. This precipitate was taken out by filtration, repeatedly washed with methanol several times, and then vacuum-dried in a desiccator for 6 hours to obtain a powder of the crosslinking polymer. This powder was subjected to molecular-weight determination (in terms of polystyrene) through GPC.

Reference Example 1

Preparation of Electrode Sheets

Eighty-five parts by weight of lithium cobalt oxide (Cellseed C-10, manufactured by Nippon Chemical Industrial Co., Ltd.) as a positive-electrode active material was mixed with 10 parts by weight of acetylene black (Denka Black, manufactured by Denki Kagaku Kogyo K.K.) as a conduction aid material and 5 parts by weight of a vinylidene fluoride resin (KF Polymer L1120, manufactured by Kureha Chemical Industry Co., Ltd.) as a binder. This mixture was slurried with N-methyl-2-pyrrolidone so as to result in a solid concentration of 15% by weight.

This slurry was applied in a thickness of 200 μm to an aluminum foil having a thickness of 20 μm (current collector) and dried at 80° C. for 1 hour and then at 120° C. for 2 hours. The coated foil was pressed with a roller press to prepare a positive-electrode sheet having an active-material layer with a thickness of 100 μm.

Eighty parts by weight of mesocarbon microbeads (MCMB 6-28, manufactured by Osaka Gas Chemical Co., Ltd.) as a negative-electrode active material were mixed with 10 parts by weight of acetylene black (Denka Black, manufactured by Denki Kagaku Kogyo K.K.) as a conduction aid material and 10 parts by weight of a vinylidene fluoride resin (KF Polymer L1120, manufactured by Kureha Chemical Industry Co., Ltd.) as a binder. This mixture was slurried with N-methyl-2-pyrrolidone so as to result in a solid concentration of 15% by weight.

This slurry was applied in a thickness of 200 µm to a copper foil having a thickness of 20 µm (current collector), dried at 80° C. for 1 hour, and then dried at 120° C. for 2 hours. The coated foil was pressed with a roller press to prepare a negative-electrode sheet having an active-material layer with a thickness of 100 µm.

Production of Reference Battery

A porous film made of a polyethylene resin was prepared which had a thickness of 16 µm, porosity of 40%, air permeability of 300 sec/100 cc, and puncture strength of 3.0 N. The negative-electrode sheet obtained in Reference Example 1, the porous film, and the positive-electrode sheet obtained in Reference Example 1 were stacked in this order. The resultant stack was introduced into an aluminum laminate package. Thereafter, an electrolyte solution composed of an ethylene carbonate/diethyl carbonate (1/1 by weight) mixed solvent and lithium hexafluorophosphate dissolved therein in a concentration of 1.0 mol/L was poured into the package. Subsequently, the package was sealed to assemble a lithium ion secondary battery. This battery was charged and discharged at a rate of 0.2 CmA three times and then charged at 0.2 CmA. Thereafter, this battery was discharged at 2 CmA to determine the 2 CmA discharge capacity A.

Discharge Characteristics of Batteries Obtained in Examples and Comparative Examples The sealed laminate type lithium ion secondary batteries obtained in the following Examples and Comparative Examples were charged and discharged at a rate of 0.2 CmA three times and then charged at 0.2 CmA. Thereafter, these batteries were discharged at 2 CmA to determine the 2 CmA discharge capacity B. Battery characteristics were evaluated in terms of the percentage (%) of the discharge capacity B to the discharge capacity A of the reference battery.

Positive-Electrode Sheet/Separator Adhesive Force

The sealed laminate type lithium ion secondary batteries obtained in the following Examples and Comparative Examples were disassembled. Each of the positive-electrode sheet/separator laminates was cut into a width of 1 cm. Thereafter, the positive-electrode sheet was peeled off in the direction of 180°, and the positive electrode/separator adhesive force was determined from the pulling force required for the peeling.

Production Example 1

Production of Crosslinking Polymer A

Methoxytriethylene Glycol Acrylate Monomer Ingredient, 40% by Weight; 3-Oxetanyl-Containing Monomer Ingredient, 25% by Weight Into a three-necked flask having a capacity of 500 mL and equipped with a reflux condenser were introduced 40 g of methoxytriethylene glycol acrylate, 35 g of methyl methacrylate, 25 g of (3-ethyl-3-oxetanyl)methyl methacrylate, 67 g of ethyl acetate, and 0.2 g of N,N'-azobisisobutyronitrile. The contents were stirred and mixed for 30 minutes while introducing nitrogen gas. Thereafter, radical polymerization was conducted at a temperature of 64° C.

At the time when about 1 hour had passed, the viscosity of the reaction mixture began to increase with progress of the radical polymerization. The polymerization was continued for further 8 hours under the same conditions. Thereafter, the reaction mixture was cooled to about 40° C., and 0.1 g of N,N'-azobisisobutyronitrile was added again thereto. This mixture was heated again to 70° C. to further conduct post-polymerization for 8 hours. Thereafter, the reaction mixture was cooled to about 40° C., and 233 g of ethyl acetate was added thereto. The resultant mixture was stirred and mixed until the whole mixture became homogeneous. Thus, an ethyl acetate solution of a crosslinking polymer A (concentration, 25% by weight) was obtained. This crosslinking polymer A had a weight average molecular weight of 340,000 and a number average molecular weight of 41,000.

Production Example 2

The same procedure as in Production Example 1 was conducted, except that methoxytripropylene glycol acrylate was used in place of the methoxytriethylene glycol acrylate. Thus, an ethyl acetate solution of a crosslinking polymer B (concentration, 25% by weight) was obtained. This crosslinking polymer B had a weight average molecular weight of 338,000 and a number average molecular weight of 36,000.

Production Example 3

The same procedure as in Production Example 1 was conducted, except that 3,4-epoxycyclohexylmethyl acrylate was used in place of the (3-ethyl-3-oxetanyl)methyl methacrylate. Thus, an ethyl acetate solution of a crosslinking polymer C (concentration, 25% by weight) was obtained. This crosslinking polymer C had a weight-average molecular weight of 2,930,000 and a number average molecular weight of 39,000.

Production Example 4

The same procedure as in Production Example 1 was conducted, except that methoxytetraethylene glycol acrylate, methoxyhexaethylene glycol acrylate, methoxynonaethylene glycol acrylate, methoxydecaethylene glycol acrylate, or methoxytetradecaethylene glycol acrylate was used in place of the methoxytriethylene glycol acrylate. Thus, ethyl acetate solutions of crosslinking polymers D, E, F, G, and H respectively (concentration of each solution, 25% by weight) were obtained.

The crosslinking polymer D had a weight average molecular weight of 253,000 and a number average molecular weight of 38,000; the crosslinking polymer E had a weight average molecular weight of 329,000 and a number average molecular weight of 80,000; the crosslinking polymer F had a weight average molecular weight of 378,000 and a number average molecular weight of 81,000; the crosslinking polymer G had a weight average molecular weight of 385,000 and a number average molecular weight of 81,000; and the crosslinking polymer H had a weight average molecular weight of 419,000 and a number average molecular weight of 75,000.

Production Example 5

The same procedure as in Production Example 1 was conducted, except that methoxytetrapropylene glycol acrylate, methoxyhexapropylene glycol acrylate, or methoxynonapropylene glycol acrylate was used in place of the methoxytriethylene glycol acrylate. Thus, ethyl acetate solutions of crosslinking polymers I, J, and K respectively (concentration of each solution, 25% by weight) were obtained.

The crosslinking polymer I had a weight average molecular weight of 346,000 and a number average molecular weight of 60,000; the crosslinking polymer J had a weight average molecular weight of 223,000 and a number average molecular weight of 61,000; and the crosslinking polymer K had a weight average molecular weight of 239,000 and a number average molecular weight of 58,000.

Production Example 6

The same procedure as in Production Example 1 was conducted, except that butyl acrylate was used in place of the methoxytriethylene glycol acrylate. Thus, an ethyl acetate solution of a crosslinking polymer L (concentration, 25% by weight) was obtained. This crosslinking polymer L had a weight average molecular weight of 357,000 and a number average molecular weight of 65,000.

Production Example 7

Ten grams of a poly(vinylidene fluoride/hexafluoropropylene) copolymer (Kynar 2801, manufactured by Elf Atochem Inc.) was dissolved in 90 g of N-methyl-2-pyrrolidone to prepare a polymer solution M having a concentration of 10% by weight.

Comparative Example 1

Ethyl acetate was added to the ethyl acetate solution of the crosslinking polymer A, and the mixture was stirred at room temperature to obtain a homogeneous crosslinking polymer solution having a concentration of 8.3% by weight.

The crosslinking polymer solution thus obtained was applied with a wire-wound bar (#20) to each side of the same porous polyethylene resin film as described above, and the solution applied was dried with heating at 50° C. to volatilize the ethyl acetate. Thus, a crosslinking polymer-supported porous film was obtained which had a coating thickness of 2.5 µm and a coating density of 3.0 g/m² on each side and in which the crosslinking polymer containing oxyethylene groups and 3-oxetanyl groups was supported.

Subsequently, the negative-electrode sheet obtained in Reference Example 1, the crosslinking polymer-supported porous film, and the positive-electrode sheet obtained in Reference Example 1 were stacked in this order. The resultant stack was introduced into an aluminum laminate package. An electrolyte solution composed of an ethylene carbonate/diethyl carbonate (1/1 by weight) mixed solvent and lithium hexafluorophosphate dissolved therein in a concentration of 1.0 mol/L was poured into the package. Subsequently, the package was sealed. Thereafter, the package was heated at 70° C. for 7 hours to cation polymerize and crosslink the crosslinking polymer A, thereby partially gelling the electrolyte solution. Thus, a lithium ion secondary battery A was assembled in which the electrode sheets had been adhered to the porous film.

Comparative Examples 2 and 3

The same procedure as in Comparative Example 1 was conducted, except that the crosslinking polymers B and C were used in place of the crosslinking polymer A. Thus, lithium ion secondary batteries B and C were obtained respectively.

Examples 1 to 3

The same procedure as in Comparative Example 1 was conducted, except that the crosslinking polymers D, E, and F were used in place of the crosslinking polymer A. Thus, lithium ion secondary batteries D, E, and F were obtained.

Comparative Examples 4 and 5

The same procedure as in Comparative Example 1 was conducted, except that the crosslinking polymers G and H were used in place of the crosslinking polymer A. Thus, lithium ion secondary batteries G and H were obtained.

Examples 4 to 6

The same procedure as in Comparative Example 1 was conducted, except that the crosslinking polymers I, J, and K were used in place of the crosslinking polymer A. Thus, lithium ion secondary batteries I, J, and K were obtained.

Comparative Example 6

The same procedure as in Comparative Example 1 was conducted, except that the crosslinking polymer L was used in place of the crosslinking polymer A. Thus, a lithium ion secondary battery L was obtained.

Comparative Example 7

The polymer solution M was applied with the same wire-wound bar as described above to each side of the same porous polyethylene resin film as described above. The solution applied was dried with heating at 60° C. to volatilize the N-methyl-2-pyrrolidone. Thus, a porous polyethylene resin film having the poly(vinylidene fluoride/hexafluoropropylene) copolymer supported on both sides thereof was obtained.

Subsequently, the negative-electrode sheet obtained in Reference Example 1, the porous film having the poly(vinylidene fluoride/hexafluoropropylene) copolymer supported thereon, and the positive-electrode sheet obtained in Reference Example 1 were stacked in this order. The resultant stack was press-bonded together at a temperature of 80° C. and a pressure of 5 kg/cm² for 1 minute to obtain a separator/electrode stack.

The separator/electrode stack was introduced into an aluminum laminate package. An electrolyte solution composed of an ethylene carbonate/diethyl carbonate (1/1 by weight) mixed solvent and lithium hexafluorophosphate dissolved therein in a concentration of 1.0 mol/L was poured into the package. Subsequently, the package was sealed to assemble a lithium ion secondary battery M.

The characteristics of the batteries obtained in Examples 1 to 6 and Comparative Examples 1 to 7 are shown in Table 1 together with the adhesive force between the positive-electrode sheet and the separator. With respect to each of Examples 1 to 6 and Comparative Examples 1 to 5, the number of repetitions (n) for the oxyalkylene groups contained in a side chain of the crosslinking polymer used is shown.

TABLE 1

| Battery | Oxyalkylene group | n | Battery characteristics (%) | Adhesive force (N/cm) |
|---|---|---|---|---|
| Comparative Example 1 | A | Oxyethylene group | 3 | 94 | 0.20 |
| Comparative Example 2 | B | Oxypropylene group | 3 | 94 | 0.20 |
| Comparative Example 3 | C | Oxyethylene group | 3 | 93 | 0.19 |
| Example 1 | D | Oxyethylene group | 4 | 98 | 0.18 |
| Example 2 | E | Oxyethylene group | 6 | 98 | 0.20 |
| Example 3 | F | Oxyethylene group | 9 | 99 | 0.21 |
| Comparative Example 4 | G | Oxyethylene group | 10 | 94 | 0.20 |
| Comparative Example 5 | H | Oxyethylene group | 14 | 92 | 0.19 |
| Example 4 | I | Oxypropylene group | 4 | 97 | 0.19 |
| Example 5 | J | Oxypropylene group | 6 | 97 | 0.21 |
| Example 6 | K | Oxypropylene group | 9 | 98 | 0.21 |
| Comparative Example 6 | L | (none) | (nil) | 85 | 0.18 |
| Comparative Example 7 | M | (none) | (nil) | 70 | 0.20 |

It can be seen from the results given in Table 1 that the lithium ion secondary batteries each produced using a separator constituted of a porous film and, supported thereon, a crosslinking polymer having two or more cation-polymerizable functional groups and having 4 to 9 oxyalkylene group repeating units in a side chain thereof show exceedingly improved battery characteristics, i.e., have been highly improved in the discharge characteristics defined as percentage to the discharge capacity of the reference battery described above.

While the invention has been described in detail and with reference to specific embodiments thereof, it will be apparent to one skilled in the art that various changes and modifications can be made therein without departing from the spirit and scope thereof.

This application is based on a Japanese patent application filed on Jun. 15, 2007 (Application No. 2007-158803), the entire contents thereof being herein incorporated by reference.

Further, all reference cited herein are incorporated herein by reference in their entirety.

Industrial Applicability

According to the invention, a porous film having a crosslinking polymer supported thereon can be provided, the porous film being for use as a separator which attains sufficient adhesion between each electrode and the separator and is excellent in the property of swelling in an electrolyte solution and which is suitable for use in producing a battery having low internal resistance and excellent high-rate characteristics. Furthermore, a process for producing a battery can be provided in which the crosslinking polymer-supported porous film is used.

The invention claimed is:

1. A crosslinking polymer-supported porous film for battery separator, comprising:
a porous film; and
a crosslinking polymer supported on the porous film, the crosslinking polymer having a plurality of cation-polymerizable functional groups in the molecule thereof and having oxyalkylene groups represented by general formula (I):

wherein the Rs may be the same or different and each independently represent a hydrogen atom or a methyl group, and n represents an integer of 4 to 9, in a side chain thereof.

2. The crosslinking polymer-supported porous film according to claim 1, wherein the cation-polymerizable functional groups are at least one selected from a 3-oxetanyl group and an epoxy group.

3. The crosslinking polymer-supported porous film according to claim 1, wherein the crosslinking polymer is a radical copolymer of: at least one radical-polymerizable monomer which has the cation-polymerizable functional group and is selected from a radical polymerizable monomer having a 3-oxetanyl group and a radical polymerizable monomer having an epoxy group; a radical-polymerizable monomer having oxyalkylene groups; and other radical-polymerizable monomer.

4. The crosslinking polymer-supported porous film according to claim 1, wherein the crosslinking polymer is a radical copolymer of: 5 to 50% by weight of at least one radical-polymerizable monomer selected from the radical-polymerizable monomer having the 3-oxetanyl group and the radical-polymerizable monomer having the epoxy group; 1 to 95% by weight of the radical-polymerizable monomer having the oxyalkylene groups; and the other radical-polymerizable monomer, based on the total monomer amount.

5. The crosslinking polymer-supported porous film according to claim 3, wherein the radical-polymerizable monomer having the oxyalkylene groups is a (meth)acrylate which has oxyalkylene groups and is represented by general formula (II):

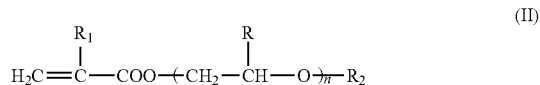

wherein the Rs may be the same or different and each independently represent a hydrogen atom or a methyl group; $R_1$ represents a hydrogen atom or a methyl group; $R_2$ represents an alkyl group having 1 to 6 carbon atoms; and n represents an integer of 4 to 9.

6. The crosslinking polymer-supported porous film according to claim 3, wherein the radical-polymerizable monomer having the 3-oxetanyl group is a (meth)acrylate which has a 3-oxetanyl group and is represented by general formula (III):

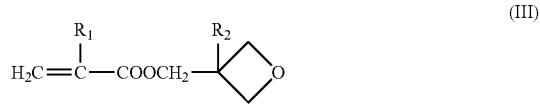

wherein $R_1$ represents a hydrogen atom or a methyl group, and $R_2$ represents a hydrogen atom or an alkyl group having 1 to 6 carbon atoms.

7. The crosslinking polymer-supported porous film according to claim 3, wherein the radical-polymerizable monomer having the epoxy group is a (meth)acrylate which has an epoxy group and is represented by general formula (IV):

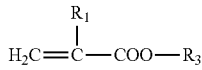

(IV)

wherein $R_1$ represents a hydrogen atom or a methyl group, and $R_3$ represents an epoxy-containing group represented by formula (1):

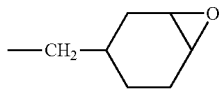

(1)

or formula (2)

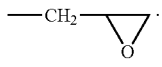

(2)

8. The crosslinking polymer-supported porous film according to claim 3, wherein the other radical-polymerizable monomer is at least one monomer selected from a (meth)acrylate represented by general formula (V):

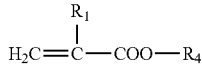

(V)

wherein $R_1$ represents a hydrogen atom or a methyl group, and $R_4$ represents an alkyl group having 1 to 6 carbon atoms or a fluoroalkyl group having 1 to 6 carbon atoms and a vinyl ester represented by general formula (VI):

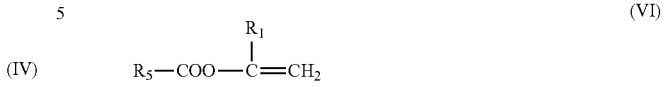

(VI)

wherein $R_1$ represents a hydrogen atom or a methyl group, and $R_5$ represents a methyl group or an ethyl group.

9. The crosslinking polymer-supported porous film according to claim 1, wherein the porous film as a substrate has a thickness in the range of 3 to 50 μm and a porosity in the range of 20 to 95%.

10. The crosslinking polymer-supported porous film according to claim 1, wherein the crosslinking polymer has a weight average molecular weight of 10,000 or higher.

11. A process for producing a battery, said process comprising:
stacking electrodes on the crosslinking polymer-supported porous film according to claim 1 to obtain an electrodes/crosslinking polymer-supported porous film stack;
introducing the electrodes/crosslinking polymer-supported porous film stack into a battery container; and
pouring an electrolyte solution containing a cation-polymerization catalyst into the battery container, whereby at least a part of the crosslinking polymer is swelled in the electrolyte solution or dissolved in the electrolyte solution at least around the interface between the porous film and the electrodes to undergo cation polymerization, thereby at least partially gelling the electrolyte solution to adhere the porous film and the electrodes.

12. The process for producing a battery according to claim 11, wherein the cation-polymerization catalyst is an onium salt.

13. The process for producing a battery according to claim 11, wherein the electrolyte solution contains at least one selected from lithium hexafluorophosphate and lithium tetrafluoroborate, as an electrolyte salt serving also as a cation-polymerization catalyst.

* * * * *